United States Patent [19]

Melber et al.

[11] Patent Number: 4,722,943
[45] Date of Patent: Feb. 2, 1988

[54] COMPOSITION AND PROCESS FOR DRYING AND EXPANDING MICROSPHERES

[75] Inventors: George E. Melber, Buffalo, N.Y.; William A. Oswald, Darien, Ill.; Leon E. Wolinski, Buffalo, N.Y.

[73] Assignee: Pierce & Stevens Corporation, Buffalo, N.Y.

[21] Appl. No.: 28,119

[22] Filed: Mar. 19, 1987

[51] Int. Cl.$^4$ .............................. C08J 9/22; C08J 9/32
[52] U.S. Cl. ...................................... 521/57; 428/407; 521/54; 521/56; 521/58
[58] Field of Search ........................ 521/54, 56, 57, 58; 428/407

[56] References Cited

U.S. PATENT DOCUMENTS 4,397,799  8/1983  Edgren et al. .................. 521/57
4,513,106  4/1985  Edgren et al. .................. 521/58

Primary Examiner—Morton Foelak
Attorney, Agent, or Firm—Waldron & Associates

[57] ABSTRACT

Microsphere wet cake is mixed with a processing aid effective to prevent agglomeration and surface bonding of the microspheres, and thereafter removing water by drying with continuous mixing, optionally also under reduced pressure, i.e. vacuum drying. By the control of the application of heat and balancing temperature and the mixing, and optionally also the reduced pressure, it is possible to also control expansion of the microspheres from substantially none to substantially theoretical limits of expansion.

The processing aid in the present invention is any one of a wide diversity of materials which meet the requirements of the intended function, i.e., to prevent the agglomeration of the microspheres during the process. Suitable materials include, by way of example, dry inorganic pigments or filler materials, and the like, and related organic materials.

9 Claims, 2 Drawing Figures

COMPOSITION AND PROCESS FOR DRYING AND EXPANDING MICROSPHERES

BACKGROUND OF THE INVENTION

A. Introduction

The present invention relates to drying of microspheres, and to the dry expansion of microspheres.

Microspheres are heat expandable thermoplastic polymeric hollow spheres containing a thermally activatable expanding agent. Such materials, the method of their manufacture, and considerable information concerning the properties and uses of microspheres, are all set forth in U.S. Pat. No. 3,615,972, issued to Donald S. Morehouse. Other teachings concerning such materials are found, for example, U.S. Pat. Nos. 3,864,181; 4,006,273; and 4,044,176.

In following the teachings of the Morehouse patent, the microspheres are made in an aqueous system by the limited coalescence process under pressure, and the resulting product is a "wet cake" of the unexpanded microsphere beads wet with water. The wet cake is typically about 40 to 75 weight percent solids, and because of the wetting agents employed in the formation of the beads, the surface will be wet. Separation of water and beads has not been a simple process.

Many important uses of the microspheres require the removal of the water, to produce dry, free flowing microsphere beads. In many uses, it is also appropriate to pre-expand the beads before use. In unexpanded form, the dry microsphere beads typically have a displacement density of about 1.1. Dry, expanded microspheres typically have a density by displacement of less than 0.06 grams/cc, and are highly useful in the production of syntactic foams in a wide variety of polymer matrices. Dry, free-flowing microspheres, and dry, free-flowing, preexpanded microspheres have now achieved a commercial recognition and market demand for such uses and others.

B. Prior Art

There have been to date few procedures by which dry expanded microspheres have been produced from wet cake. Dry free-flowing unexpanded microsphere beads have not heretofore been available except as a laboratory curiosity, and no commercially practicable procedure for producing such a product has as yet emerged.

In U.S. Pat. No. 4,397,799, pre-expanded, dry, low density microspheres are produced by spray drying. In addition to the inherent expansion of the beads, the spray drying procedure has several disadvantages. First and foremost, the erection of a dedicated spray drying facility is required, representing a very substantial capital investment, and very considerable operating expenses, particularly for skilled labor and utilities costs in heating the drying fluid. In addition, the product is produced entrained in a heated, moving fluid stream, and the requirements of collection, recovery and handling are considerable. In addition, it is not feasible to produce the expanded product at the point of use, because of the size and expense of the facility, so that the spray drying approach largely mandates shipping of large volumes at considerable expense. Not to be neglected is the requirement that the spray drying be conducted under an inert atmosphere, since the usual blowing agents entrained within the microspheres are generally highly flammable, and often explosive. The usual procedure is to employ nitrogen as the spray drying fluid, with a necessary, and highly expensive safety burden on the system. Recovery of the expanded beads from the system is also demanding, not only to avoid product losses, but also because of the dust pollution of the working environment and atmosphere that can result.

Expansion of microsphere beads is attained in the process of U.S. Pat. No. 4,513,106, where the wet cake is injected into a flow stream of steam, which is subsequently quenched in cool water. This produces preexpansion of the microspheres, but still wet with water, at low solids content. While solids contents as high as fifteen percent have been occasionally been produced, the typical product is more often about 3 to 5 percent solids. The water limits the applications to which the procedure is applicable.

C. Objects of the Invention

It is an object of the present invention to provide a process for drying of thermoplastic microspheres from wet cake.

It is another object of the present invention to provide a process for producing dry, free flowing microsphere beads.

A further object is to provide dry, pre-expanded microspheres from wet cake.

It is also an object of the present invention to provide dry, free-flowing microspheres, and dry, free-flowing pre-expanded microspheres, by a process which is reasonably inexpensive to capitalize and operate, which can be provided at the site of use of the product at economical levels of utilization, and which can be operated with modest labor and utility costs.

It is an object of the present invention to provide dry, free-flowing microspheres having unusual and unique properties and characteristics.

It is yet another object to provide a method for drying and expanding microspheres which is less susceptible than the procedures of the prior art to hazards of explosion, fires, and environmental dust pollution of the work environment.

SUMMARY OF THE INVENTION

In the present invention, the microsphere wet cake is mixed with a processing aid effective to prevent agglomeration and surface bonding of the microspheres, and thereafter removing water by drying with continuous mixing, optionally also under reduced pressure, i.e. vacuum drying. By the control of the application of heat and balancing temperature and the mixing, and optionally also the reduced pressure, it is possible to also control expansion of the microspheres from substantially none to substantially theoretical limits of expansion.

The processing aid in the present invention is any one of a wide diversity of materials which meet the requirements of the intended function, i.e., to prevent the agglomeration of the microspheres during the process. Suitable materials include, by way of example, dry inorganic pigments or filler materials, and the like, and related organic material.

DETAILED DISCLOSURE

Figure 1:
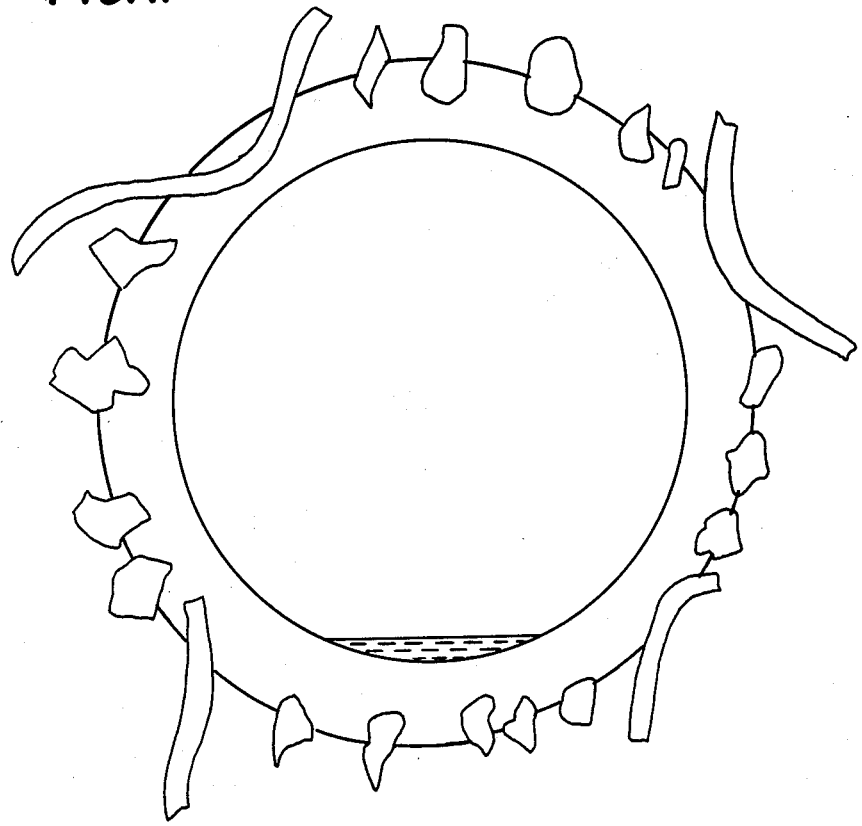
FIG. 1 is a schematic representation of the appearance of a microsphere of the present invention after drying and expansion, showing the microsphere with particles of processing aid embedded in the surface thereof.
Figure 2:
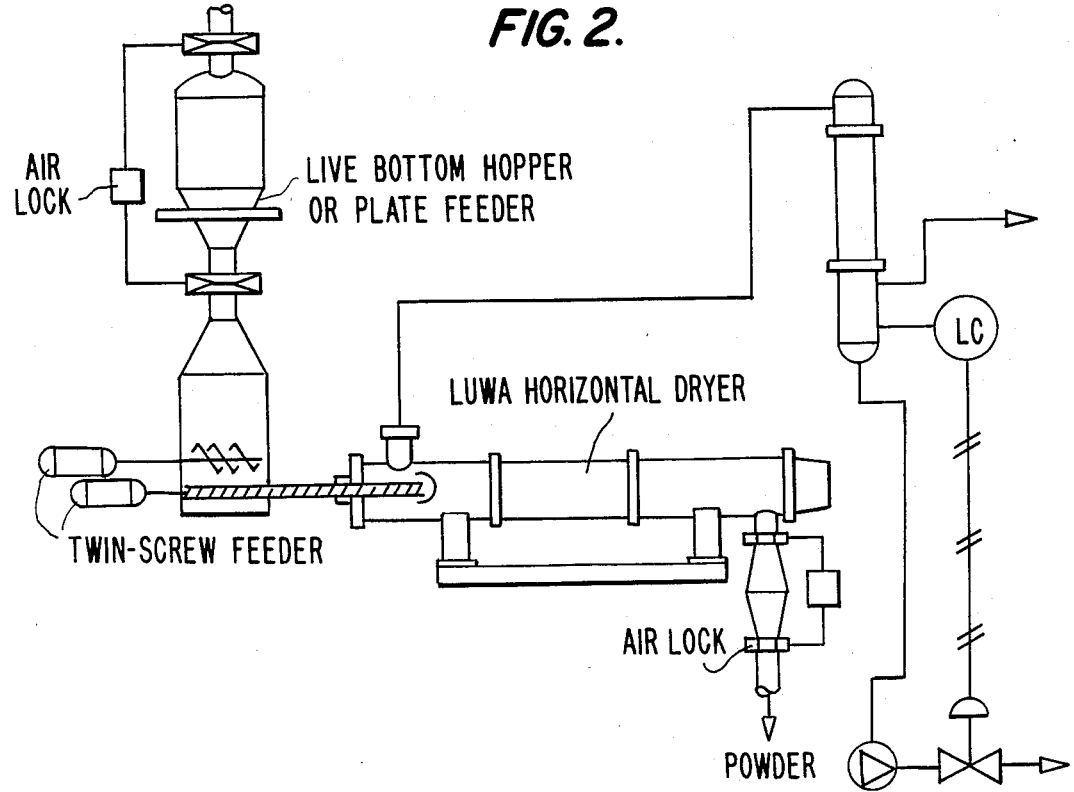
FIG. 2 is a schematic flow diagram showing the drying operation of the present invention as described in Example 1, infra.

The most common uses of expanded, dry microspheres resides in the blending of these materials into polymer binder system as a constituent in syntactic foam formulations. The exceptional ultra-low density characteristics has led to drastic changes in the ways in which the weight and volume relationships of such materials are considered. For example, shipping of dry expanded microspheres imposes an enormous cost-per-pound burden on freight and shipping costs, while in other circumstances, there is an economic leverage impossible with any other approach. As a general rule of thumb, the addition of one percent by weight of the expanded microspheres will represent the substitution of about twenty percent by volume in typical systems.

The characteristics of the microspheres has precluded many approaches to their drying and pre-expansion. Severe agglomeration and adherence of the materials to warm surfaces of equipment have eliminated most approaches to such procedures from serious consideration. Wet expansion in steam is of limited use when dry microspheres are needed, and the spray drying procedure is so expensive, and the product so prone to excessive, and extremely difficult, dusting problems, that the effective development of the potential markets has been limited by such factors.

It has now been observed that processing aids can be employed, in substantial proportions by weight, which prevent agglomeration of the microspheres upon drying and pre-expansion, and that such materials actively and effectively suppress dusting of the expanded products as well. This combination of features and observations has led to the development of effective drying, and optional expansion, of microspheres by mixing such processing aids into the wet cake, followed by drying, optionally vacuum drying, and recovery of the dry, freeflowing product. The microspheres remain in the desired unicellular condition, and substantially free of undesirable agglomeration. The expansion can be up to the very limits of the microspheres, as established by prior efforts in the art.

It is important to the present invention that in the context of most uses of the dry, expanded microspheres, it is the volumetric considerations which are most often of dominant importance, so that even quite substantial proportions of the processing aids on a weight basis form a negligible or very minor component on a volumetric basis. For example, employing talc as the processing aid, the volume and weight relationships of the dry, expanded microspheres with varying amounts of talc show the relationships detailed in TABLE I.

TABLE I

| EXPANDED MICROSPHERES BLENDED WITH TALC MICROSPHERE CONTENT OF PRODUCT | |
|---|---|
| WEIGHT % | VOLUME % |
| 80 | 99.6 |
| 50 | 98.6 |
| 20 | 94.4 |
| 10 | 88.2 |
| 5 | 78.0 |
| 3 | 67.6 |

NOTES:
Data are based on Microspheres at 0.04 gm/cc and the talc at 2.70 gm/cc.

As the relationships in Table I show, even quite large proportions of talc by weight represent a minor fraction of the volume of the dry expanded product. Particularly since it is possible to find such materials as entirely conventional fillers and/or pigments in many polymer systems of interest for the use of the microspheres, it is generally preferred to employ such materials as the processing aids in the present invention. It is also of interest to employ fibrous forms of such materials, as well as reinforcing fillers, as particularly preferred processing aids when possible, for their added benefits as constituents of the final syntactic foams. It will often be advantageous to employ both particulate and fibrous processing aids, or more than one type of processing aid in mixtures and combinations with one another.

In most uses of the dry expanded microspheres, such materials will often be a constituent of the formulation intended by the end user in any event, and it is simply necessary to make corresponding reductions in the loading of such fillers and pigments in the formulation to compensate for the increment included with the microspheres. A wide diversity of such materials will meet the functional requirements of the present invention, so that it is possible in almost all circumstances to find a processing aid compatible with the formulating requirements of the intended end use.

It has been observed that with appropriate levels of such processing aids, the tendency of the microspheres to agglomerate, or to stick to heated surfaces of drying equipment is effectively eliminated, and the dusting of the final expanded product is materially reduced, if not effectively eliminated.

By the achievement of the processing characteristics of the mixture, it has become possible to employ equipment that permits effective drying and expansion at temperatures where the need for an inert atmosphere is eliminated without the introduction of substantial fire and explosion hazards. This represents a quite material reduction in expense, and a real gain in system safety.

As those of ordinary skill in the art will readily recognize, there are a substantial number of parameters which govern the method and the products produced in the present invention. Each of the known parameters is hereafter discussed in turn in relation to the present invention.

Microspheres are generally available in the form of a wet cake, which is typically about 40 percent water, about 60 percent unexpanded microsphere beads, and minor additional amounts of the materials employed in the manufacture of the beads by the process of the Morehouse patent, i.e., "wetting agents."

The most readily available microspheres are those available from Pierce & Stevens Corporation, 4475 Genesee Street, Buffalo, N.Y., under the trademark "EXPANCEL" which are polyvinylidene chloride microspheres with an inclusion of iso-butane as the blowing agent. The available materials are preferred in the present invention, primarily for their availability and reasonable cost.

As the Morehouse patent indicates, microspheres can be made from a rather wide diversity of thermoplastic polymers. In practice, the commericially available microspheres are generally limited to polyvinylidene chloride. Microspheres of other materials, such as polyacrylonitrile, poly-alkyl methacrylates, polystyrene, or vinyl chloride, are known, but these materials are not widely and generally available. The present invention is applicable to any thermoplastic of which microspheres is made, but since the polyvinylidene chloride materials are those most available to the art, the discussion herein will be directed predominantly to that material. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, particularly propane, butane, pentane, and mixtures thereof, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres.

In unexpanded form, the microspheres can be made in a variety of sizes, those readily available in commerce being most often on the order of 2 to 20 microns, particularly 3 to 10 microns. It is possible to make microspheres in a wider range of sizes, and the present invention is applicable to them as well. It has been demonstrated, for example, that microspheres can be made from as small as about 0.1 micron, up to as large as about 1 millimeter, in diameter, before expansion. Such materials are not generally available.

While variations in shape are possible, the available microspheres are characteristically spherical, with the central cavity containing the blowing agent being generally centrally located.

Dry, unexpanded microspheres typically have a displacement density of just greater than 1, typically about 1.1.

When such microspheres are expanded, they are typically enlarged in diameter by a factor of 5 to 10 times the diameter of the unexpected beads, giving rise to a displacement density, when dry, of 0.1 or less, often about 0.03 to 0.06.

While the microspheres are produced in an aqueous suspension, it is common to break and de-water the suspension, and to supply the microspheres in the form of a "wet cake" of about sixty percent solids. This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The present invention is based on the use of conventional contact type, indirect heat exchange mixing driers. A wide diversity of types of equipment are applicable. In general terms, the requirements are for good temperature control, good mixing of powder and granular materials, optionally with operation at reduced pressure provided, and the removal and recovery, preferably with condensation of the evaporated water and entrained blowing agent. Cooling of the microspheres, either in the mixing drier itself, or in ancillary equipment is also preferred.

There is a great diversity of driers available, at almost any desired scale of operations which meet the foregoing criteria with a capability of either batch or continuous operation in the context of the present invention. As a general rule continuous operation is preferred.

Among the commercially available driers with which the present invention has been employed are the following:

(1) Luwa Corp: Horizontal Thin Film Contact Driers
(2) Charles Ross & Son: Ross-Bolz Cone Screw Drier These quite different units have performed quite satisfactorily in the practice of the present invention, as shown in the examples, infra.

The processing aid in the present invention is any one of a wide diversity of materials which meet the requirements of the intended function. It is required that the processing aid be a free flowing solid at the temperature and pressure of the drying operation, that it not react chemically with the microspheres, or with the other constituents of the system, e.g. the wetting agents and related components of the wet cake, and that at the temperature of the expansion, that it function to separate the microspheres undergoing expansion so that they do not come into contact and bond to one another.

The processing aid may be selected from one or more components meeting the following general characteristics:

The aid should be a finely divided particulate or fibrous material. It may be spherical or irregular in shape, and it may be a solid or a hollow particle.

The aid should be a free-flowing solid under the processing conditions of the present invention. It should have a melting point, for example, above the temperature of the drying process, generally above about 180 degrees C.

The aid must be finely divided enough to be able to effectively blend with and adhere to the surfaces of the microspheres. The maximum major dimension of the particle size should be no larger than about the diameter of the expanded microspheres, and preferably less. The minor dimensions will generally be as small as possible, which imposes a de facto lower limit of effectively about 2 microns.

While the aid may be either organic or inorganic, there are ordinarily considerable advantages to the employment of inorganic materials as at least a substantial component of the processing aid. Such materials are commonly available in the dimensions of interest, they are common inclusions along with the microspheres in a wide diversity of syntactic foam formulations, they pose few problems in compounding and formulating end uses of the microspheres, and they are generally less expensive. It is also generally easier to assure that the aid does not itself develop undesirable characteristics in the processing, i.e., by becoming tacky itself of the like.

The processing aids are desirably materials which are pigments, reinforcing fillers, or reinforcing fibers in polymer formulations and thus are commonly used in the formulations where the microspheres are to be used. For example, talc, calcium carbonate, barium sulfate, alumina, such as particularly alumina tri-hydrate, silica, titanium dioxide, zinc oxide, and the like may be employed. Other materials of interest include spherical beads, or hollow beads, of ceramics, quartz, or glass.

Among the fibrous materials of interest are glass fibers, cotton flock, carbon and graphite fibers, and the like. All these are typical and illustrative of the commonly employed materials in syntactic polymer foam compositions, and those of ordinary skill in the art will be familiar with others that can also be suitably employed.

The selection of suitable processing aids among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:

The primary function of the processing aid is to prevent the microspheres from coming into direct contact with one another and with the surfaces of the processing equipment while in a tacky, thermoplastic state, and thus to prevent them adhering. The aid provides this result by virtue of adhering to the tack surfaces of the microspheres as soon as the reach a tacky state, and continuing to adhere throughout the process. The aid thus becomes embedded in the surface of the microspheres, and forms a buffer between the thermoplastic material and any other materials with which it might otherwise come into contact.

When the present invention is being conducted for a particularly, known end use, it is ordinarily possible to tailor the selection of the processing aid to the requirements of use. It is generally desirable to consider the processing aid as a unit from unit replacement for the same material in the intended use. As those of ordinary skill in the art will readily recognize, the fact that the processing aid will adhere to the surface of the microspheres may be a factor that will require adjustment of proportions, but such requirements will not ordinarily be substantial or critical.

When combinations of different materials are employed as the processing aid, it is possible to stay within the corresponding requirements of virtually any designed formulation.

By virtue of the higher density of the processing aid that that of the expanded microspheres, the composite product has a greatly reduced tendency to become entrained in gas streams or in the environmental atmosphere. As those of ordinary skill in the art will readily appreciate, the tendency to dusting is a material safety hazard, both in terms of exposure of workers and in terms of fire and explosive hazards. Since the microspheres contain an alkane blowing agent in substantial proportions, large quantities of these materials in the atmoshere presents a substantial problem in some circumstances. The difficulties, and the effort and expense of their resolution are minimized or eliminated altogether in the present invention.

Generally, the greater the density of the processing aid, the greater the reduction in the dusting problem. Since the major proportion of the product on a weight basis is the processing aid, addition of a high density aid to the system can effectively eliminate any dusting problems.

By virtue of the increased density of the composite, the demands on the processing equipment and system in recovering the expanded and dried microspheres from fluid streams is greatly facilitated, and product losses are substantially reduced.

The processing aid is used in the present invention in an amount sufficient to permit the drying and expansion of the microspheres without sticking to the equipment employed or forming agglomerations of microspheres. While this amount will vary depending on the particular equipment employed, and with the particular processing conditions, it will most often be on the range of about 20 to 97 weight percent of the mixture of aid and microspheres, on a dry weight basis. As a general rule, in most circumstances the amount employed should be the least amount that will reliably and consistently achieve the defined function of the aid. It is generally preferred that the aid be employed in amounts less than 90. and preferably than 80 weight percent of the blend. This normally results in a dry expanded product which is more than 90 volume percent microspheres.

Since the predominant concerns in most uses of microspheres is with the volumetric proportions, even quite considerable proportions by weight of the processing aid can be included without detriment in the end uses. When substantial amounts of the processing aid are introduced as a component of the microsphere formulation, appropriate allowances for this component should be made in the compounding of materials.

In the present invention, contact drying of the microspheres is accomplished with active mixing, optionally at low pressure, in the presence of the processing aid. The term contact heating is employed in the present application to connote heating or drying involving procedures other than direct heat exchange in a heated fluid, particularly in a heated gas stream. Contact drying processes employing indirect heat exchange are generally well known in other contexts, but in the context of the present invention, must be adapted to accommodate the particular and unusual conditions of operation, as described infra.

Contact drying, including vacuum drying, is widely practiced for very diverse and demanding operations which are temperature sensitive. Reducing solutions, suspensions, dispersions, slurries and semisolid wet cake to dry, free-flowing granular solids is commonly achieved in many industries with a great diversity of products. There are a substantial number of types of equipment in common use, substantially any of which can be adapted to use in the present invention. Most such equipment employs indirect heat exchange, using steam, heated oil, or the like as a heat transfer medium. Such drying operations commonly employ mixing means to distribute the material within the drier, and to prevent agglomeration of the material. Reduced pressures range from atmospheric downward below atmospheric to as low as 1 mm Hg absolute in such operations.

Such drying operations are employed in some contexts with thermoplastic materials, although not at temperatures at which the thermoplastic melts or softens, since at a point near the melting point or the glass transition temperature of thermoplastic polymers, a highly tacky state arises, which would result in severe agglomeration into a relatively monolithic mass and sticking to the equipment.

It has now been discovered that such equipment can be employed for drying and expanding thermoplastic microspheres, at temperatures at which the thermoplastic material becomes tacky and adherent, by virtue of the action of the processing aid and the continuous mixing, which combine to prevent sticking to the equipment and agglomeration of the microspheres.

It is also common in such equipment to remove and condense the "distillate" removed from the solid. Since this is done on a continuous basis, the hazards in the present system as a consequence of accumulations of the highly flammable or explosive blowing agent are avoided. The blowing agent, typically iso-butane, is continuously removed and condensed in such equipment. This eliminates the need, as has been common in the drying of microspheres by spray drying procedures, of employing a non-oxidizing atmosphere in the drying chamber. Use of air, or other oxygen containing gases has proved an unacceptable fire and explosion hazard in such systems, and most are operated by employing nitrogen or some other inert gas as the heat exchange medium. Inert gas direct heat exchange is quite expensive, and still requires care in the handling of the substantial gas stream with the blowing agent carried with it, and thus solves only a part of the hazard.

The equipment selected for use must, rather evidently, provide for adequate heat transfer to remove substantially all the water from the feed stock. The significant control parameters for any given equipment will be residence time, pressure, and heat input, normally based on operating temperature for convenience. At the residence time and pressure employed, heat exchange must be accomplished within the constraints of the temperature limitations of the microspheres, which not reach a temperature at which the blowing agent bursts the sphere.

The equipment must also provide the energy for the expansion itself. This is not large, and in most circumstances achieving a bead temperature (depending on the specific polymer) at which expansion occurs, as previously defined, there will be little difficulty in attaining the desired degree of expansion. In most circumstances, full expansion is desired, i.e., to a microsphere density of less than 0.06, preferably about 0.03 (without the processing aid).

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also an important control parameter, since there is a definite duration of the expansion process. Even when adequate temperatures are achieved, if the residence time at temperature is too short, the expansion may be insufficient. If the time is too long, the microspheres themselves may be disrupted, leaving broken spheres and polymer fragments and grit in the product, with attendant losses of production.

As a general parameter, the time and temperature to be achieved is defined by the nature of the polymer of which the microspheres are made. The temperatures are generally near, but not materially above, the glass transition temperature of amorphous materials and the melting temperature of crystalline polymers. These matters are discussed in more detail in the Morehouse patent.

It is the function of the processing aid to prevent the formation of aggregates of the microspheres to the maximum attainable degree. In most drying equipment this particular requirement is facilitated by the use of continuous, often relatively high speed, low shear mixing of the material in the drier. It is worth note that excessive shear in the mixing operation may result in disrupting the microspheres, and must be avoided.

It is generally believed, although applicants have no wish to be bound thereby, that the processing aids in the present invention function to adhere to the surface of the microspheres as they reach a temperature at which the polymer material becomes tacky. By such adherence over the surface of the particles, the superficial layer of the aid precludes surface bonding between microspheres as they come into contact.

It is one of the unique features of the present invention that the microsphere beads can be dried without expansion. This has not been possible in any effective process in the prior art. Such a result is achieved by drying at temperatures below that at which the microspheres soften, and where the internal pressure of the blowing agent is less than that needed to cause expansion. Since the microspheres typically expand at temperatures on the order of about 120 degrees C., drying can proceed effectively at lower temperatures. By use of reduced pressures, the drying can proceed at considerable rates.

The degree of expansion can range from substantially none, to the known limits of expansion. This parameter is determined by the temperature, the residence time at temperature, and to a lesser degree, by the pressure in the system. By balancing these parameters against the requirements for evaporating the water, substantially any degree of expansion desired can be attained.

It is important to have the processing aid well dispersed in the continuous aqueous phase during the drying operation. This requirement ordinarily mandates a pre-mixing operation to disperse the processing aid into the wet cake before it is fed to the drier. In some cases, there may be adequate mixing in the drier to achieve adequate dispersion before the point at which the drying proceeds to the extent that requires uniform dispersion, but in most circumstances, those of ordinary skill in the art will recognize, a pre-mixing step will insure better results. It will generally not be necessary to add wetting agents or surfactants into the mixture in order to attain adequate dispersion because of the wetting agents already present in the wet cake.

The microsphere beads expand at a temperature which is a function of the specific polymer and blowing agent employed. Typically, expansion occurs at about 120 degrees Centigrade. At reduced pressure, expansion may occur at slightly lower temperatures.

Expansion requires that the blowing agent develop a substantial internal pressure (as compared with the external pressure), and that the polymer become softened enough to flow under the effect of the internal pressure. This generally means that the polymer must be heated to a point near its melting or glass transition temperature, or very slightly above, typically about 120 degrees. If the polymer temperature is too high, the microspheres will over-expand, burst, and collapse. The upper limit of temperature should be about 180 degrees, and preferably no higher than 150 degrees. At these temperatures, the residence time at temperature should be brief.

It will often be desirable to conduct the drying operation at reduced pressure to accelerate the rate of the water removal. Thus in the present invention pressures from ambient to as low as 1 mm Hg absolute have been employed with success. As those of ordinary skill in the art will readily recognize, the balancing of time, temperature, and pressure can be readily adapted to the substantially complete removal of the water and the appropriate expansion of the microsphere beads. Particularly when little or no expansion is wanted, low pressure drying greatly facilitates low temperature operations at which the expansion of the microspheres does not occur.

As the temperature is raised to the point at which the microspheres begin to soften and expand, and their surface area becomes tacky, the processing aid will adhere to the surface. It is this adherence which prevents agglomeration, and good mixing operates to maximize the extent of contact between the processing aid and the microspheres at this stage in the process. The extent of the mixing is not narrowly critical, so long as a relatively homogenous dispersion of the aid and the microspheres is maintained, and so long as the mixing does not disrupt the structure of the microspheres.

It is generally preferred to actively cool the dried and expanded microspheres before they are collected and packaged or otherwise handled. When reduced pressure is employed in the drier, it is preferred that the microspheres be stabilized by cooling before the pressure is increased. This minimizes the degree to which the pressure can operate on the polymer and possibly disrupt the system which the polymer is in the plastic state.

The resulting dry microspheres can be conveniently recovered from the drier, collected and handled by entirely convention procedures and equipment usually employed in such drying operations for dealing with powdered or granular materials.

The result of the process is the production of a unique form of the microspheres. The microspheres will have an adherent surface deposit of the processing aid, often embedded in the surface of the polymer material. When an excess of the processing aid is used, there may be an additional amount of free material entrained in, but not bound to the surface of, the microspheres. The particulate or fibrous material may form a discontinuous layer on the surface, or in other circumstances may completely coat the surface in a continuous layer. By varying the proportions of the aid and the microspheres, either condition may be attained.

Depending on the intended environment of use, either condition may be preferred. For example, when the microspheres are to be incorporated into a polymer matrix which does not readily wet and bond to the polyvinylidene chloride, the embedded particles of the processing aid can function effectively as a "primer" coating on the beads, resulting in improved bond strength in such circumstances. In other cases, where the polymer binder forms strong bonds directly to the polyvinylidene chloride, a discontinous coating of the aid may result in better bonding.

The microspheres of the present invention will often have a higher incidence of deformed, non-spherical shapes when compared to the dried and expanded microspheres from the steam expanding and spray dry-expansion processes of the prior art. It has been found that the level of disrupted microspheres, where the hollow structure with a continuous form is broken, are not frequent, and are as low or even lower than the case of the prior art processes. The distorted spherical shape that results for a proportion of the microspheres in the present invention is an advantage in some applications, and in others can ordinarily be tolerated. There are few, if any, applications of dry, pre-expanded microspheres which are dependent on the spherical shape of the microspheres.

The microspheres of the present invention are a dry, free-flowing powder, ordinarily having less than about one weight percent moisture. Because there will still be a residuum of the "wetting agents" remaining from the limited coalescence process by which the microspheres were made, the product will be slightly hygroscopic, and unless protected from ambient moisture, will gradually take up additional water. The materials involved are not so strongly hygroscopic, however, that this is a large problem. In most circumstances, unprotected microspheres will tend to stabilize at a water content of about 1.5 weight percent. The microspheres will remain a free flowing powder even under such conditions.

The microsphere product of the present invention can be un-expanded, i.e., with a density of about 1.1, or can be expanded to very near the limit of expandability, i.e., to a density of about 0.03. Intermediate values are also possible. When the aid is taken into account, the composite density will, of course, be higher. Thus the composite density of the product will be determined by the density of the particular aid employed, the amount of the aid included, and the degree of expansion. Those of ordinary skill in the art will be able to readily determine the composite density of the product from the information provided in Table I, hereinabove.

The inclusion of the processing aid also results in an expanded product with greatly reduced dusting tendencies. This has been a serious problem with dried, expanded microspheres, leading to atmospheric dust pollution, and to the possibilty of dust explosions. The reduced dusting facilitates safety considerations, including compliance with environmental laws and regulations relating to dust in the work place, and the like.

The foregoing description is general in scope. For the particular guidance of those of ordinary skill in the art, the following specific examples are intended to provide particular demonstrative guidance in the practice of the present invention.

EXAMPLE I

A blend of talc, as the processing aid, with EXPANCEL 551 microsphere wet cake, as obtained from PIERCE & STEVENS CORPORATION, of Buffalo, N.Y., was formed containing 85% talc and 15% microspheres, on a dry weight basis. The wet cake employed contains 65% microspheres and 35% water by weight. The blend was thoroughly mixed, and on a weight basis contained 78.6% talc, 13.9% unexpanded microspheres, and 7.5% water. The density of the unexpanded microspheres is 1.1.

The blends thus formed were continuously fed to, dried and expanded in a Luwa Corp. Type D horizontal thin-film contact dryer provided for continuous vacuum drying. The several blends were continuously fed to the dryer and expanded at a temperature of about 108 degrees C. The pressures employed varied from 105 mm Hg to atmospheric. Retention time in the drier was 2 minutes.

The product obtained from the various runs was free flowing and without agglomerates, and had a composite density of from about 0.246 to 0.444, which corresponds to a density of the microsphere component of from 0.04 to 0.08.

The results of these trials is set out in more detail in TABLE II:

TABLE II

| Run No. | Pressure mm Hg | Temperature Deg. C. | Composite Density gr/cc | Microsphere Density gr/cc |
|---|---|---|---|---|
| 1 | 105 | 108 | .246 | .042 |
| 2 | 105 | 108 | .300 | .051 |
| 3 | 105 | 108 | .365 | .062 |
| 4 | 305 | 108 | .367 | .062 |
| 5 | 265 | 108 | .369 | .062 |
| 6 | 235 | 108 | .444 | .075 |
| 7 | 205 | 108 | .404 | .068 |
| 8 | 175 | 108 | .406 | .069 |
| 9 | 325 | 108 | .377 | .064 |
| 10 | 360 | 108 | .354 | .060 |
| 11 | 390 | 108 | .346 | .058 |
| 12 | 445 | 108 | .342 | .058 |
| 13 | 500 | 108 | .318 | .054 |

EXAMPLE II

The same blend of talc and EXPANCEL 551 was vacuum dried and expanded as a batch in a Ross-Bolz Cone Screw Mixer, jacketed for heat and adapted for vacuum operation. The blend was dried and expanded at a temperature of about 205 degrees F, and a reduced pressure. The residence time in the mixer was about one hour.

The resulting material showed a composite density of 0.186, in the form of a free flowing powder with no indications of agglomeration, and no evidence of any adherence to the walls of the steam jacketed equipment. The composite density achieved is the result of the microspheres being expanded to a density of 0.03 grams per cc.

SUMMARY

As those of ordinary skill in the art will readily appreciate, the ability to produce the unique microspheres of the present invention is a highly valuable addition to those products available in the art of syntactic forms in particular. It is not intended that the invention be limited by the foregoing specification and the illustrative and exemplary material set forth hereinabove. Rather it is intended that the invention be defined and construed by the following claims:

What is claimed is:
1. The method of drying expandable thermoplastic polymer microspheres in a wet cake to produce free-flowing dry microspheres comprising the steps of:
   A. mixing a thermoplastic microsphere wet cake with a processing aid, wherein said processing aid is a free-flowing particulate or fibrous solid, having a softening or melting or point at a temperature above that of said thermoplastic,
   B. drying said wet cake with continuous mixing at a temperature and for a time sufficient to remove sufficient water to produce a free flowing particulate microspheres having a coating of said processing aid embedded in and/or adhered to the surfaces thereof, and
   C. Collecting free-flowing dry microspheres.
2. The method of claim 1 wherein said drying step is at a temperature and for a time sufficient to expand said microspheres.
3. The method of claim 1 wherein said drying step is at a temperature and for a time such that substantially no expansion of the microspheres occurs.
4. The method of claim 1 wherein said drying step is at a reduced pressure below ambient.
5. The method of claim 1 wherein said drying step is at a pressure in the range of from ambient to about 1 mm Hg absolute.
6. The method of claim 1 wherein said drying step is sufficient to remove water to a level not more than one weight percent of the microspheres.
7. The method of claim 1 wherein said drying step is at ambient pressure.
8. The process of claim 1 wherein said processing aid is a member selected from the group consisting of talc, calcium carbonate, barium sulfate, alumina, silica, titanium dioxide, zinc oxide, spherical beads, or hollow beads, of ceramics, quartz, or glass, glass fibers, cotton flock, carbon and graphite fibers, and mixtures thereof.
9. The process of claim 1 wherein said dry, free-flowing microspheres comprise from about 3 to about 80 weight percent hollow thermoplastic microspheres and from about 97 to about 20 weight percent of a processing aid.

* * * * *